United States Patent
Wang et al.

(10) Patent No.: US 9,911,541 B2
(45) Date of Patent: Mar. 6, 2018

(54) SUPERCAPACITOR

(71) Applicant: The Penn State Research Foundation, University Park, PA (US)

(72) Inventors: Donghai Wang, State College, PA (US); Ran Yi, State College, PA (US); Shuru Chen, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 132 days.

(21) Appl. No.: 14/746,011

(22) Filed: Jun. 22, 2015

(65) Prior Publication Data
US 2016/0049261 A1    Feb. 18, 2016

Related U.S. Application Data

(60) Provisional application No. 62/015,005, filed on Jun. 20, 2014.

(51) Int. Cl.
| | |
|---|---|
| *H01G 11/04* | (2013.01) |
| *H01M 4/38* | (2006.01) |
| *H01M 12/00* | (2006.01) |

(52) U.S. Cl.
CPC .......... *H01G 11/04* (2013.01); *H01M 4/382* (2013.01); *H01M 12/005* (2013.01)

(58) Field of Classification Search
CPC ..... H01G 11/04; H01M 4/382; H01M 12/005
See application file for complete search history.

(56) References Cited

U.S. PATENT DOCUMENTS

| | | |
|---|---|---|
| 8,379,367 B2 | 2/2013 | Oh et al. |
| 8,792,224 B2 | 7/2014 | Kim et al. |
| 2006/0040182 A1* | 2/2006 | Kawakami .......... H01M 10/052 429/218.1 |
| 2011/0043968 A1 | 2/2011 | Kim et al. |
| 2012/0077080 A1* | 3/2012 | Liu .................. H01G 11/06 429/206 |
| 2012/0293912 A1 | 11/2012 | Kim et al. |
| 2013/0052489 A1 | 2/2013 | Zhamu et al. |
| 2013/0309563 A1 | 11/2013 | Xu et al. |

FOREIGN PATENT DOCUMENTS

WO    2014088711 A1    6/2014

OTHER PUBLICATIONS

International Search Report and Written Opinion for PCT/US2015/036936 dated Apr. 8, 2016.

* cited by examiner

*Primary Examiner* — Brittany Raymond
(74) *Attorney, Agent, or Firm* — Buchanan Ingersoll & Rooney PC

(57) ABSTRACT

Embodiments provide a hybrid supercapacitor exhibiting high energy and power densities enabled by a high-performance lithium-alloy anode coupled with a porous carbon cathode in an electrolyte containing lithium salt. Embodiments include a size reduced silicon oxide anode, a boron-doped silicon oxide anode, and/or a carbon coated silicon oxide anode, which may improve cycling stability and rate performance. Further embodiments include a hybrid supercapacitor system using a Li-active anode in an electrolyte including LiPF6 in a mixture of ethylene carbonate, diethyl carbonate, and dimethyl carbonate (EC:DEC:DMC, 2:1:2 by vol.) and 10 wt % fluoroethylene carbonate (FEC), which may reduce the self-discharge rate.

14 Claims, 14 Drawing Sheets

SUPERCAPACITOR

CROSS-REFERENCE TO RELATED APPLICATIONS

This patent application claims the benefit of U.S. Provisional Patent Application No. 62/015,005, filed on Jun. 20, 2014, which is hereby incorporated by reference in its entirety.

STATEMENT REGARDING FEDERALLY SPONSORED RESEARCH OR DEVELOPMENT

This invention was made with government support under Grant No. DE-AC02-05CH11231, awarded by the Department of Energy. The Government has certain rights in the invention.

BACKGROUND OF THE INVENTION

Field of the Invention

Embodiments disclose a supercapacitor with a high-performance lithium-alloy anode, and in particular a supercapacitor with a boron doped lithium-alloy anode and a highly porous carbon (C) cathode.

Background of the Related Art

The expanding market of portable electronic devices and, especially, the emergence of electric vehicles and hybrid electric vehicles have created increasing demand for advanced energy storage techniques that can provide high energy and power densities and long cycling life. Two energy storage systems that are typically used in practical applications of portable electronic devices are lithium-ion batteries (LIBs) and supercapacitors (SCs). These two systems generally represent two extremes of the design space.

Generally, LIBs can deliver high energy densities (150-250 Wh/kg) by utilizing Faradaic reactions throughout the active materials comprising the batteries. However, this mechanism may lead to low power densities (<1000 W/kg) since solid-state ion diffusion in bulk electrodes is generally slow. LIBs may also suffer from short cycling lives (<1000 cycles) due to degradation of material structures.

On the opposite extreme, SCs typically offer high power densities (~10,000 W/kg) because of the fast physical sorption rates of charges on the surfaces of active materials comprising the capacitors. This mechanism may also enable long cycling lives (>100,000 cycles) because it generally does not cause major structural changes. However, as only the surface is typically utilized, the energy densities of SCs are very limited (e.g., 5-10 Wh/kg).

Hybrid supercapacitors or supercapacitor-battery hybrid energy storage systems have been proposed as a way to incorporate the advantages of both LIBs and SCs into one system. Existing supercapacitor systems consist of SC electrodes (activated carbon) as cathodes to ensure high power density through adsorption/desorption of anions and LIB electrodes as anodes to provide high energy density by lithium (Li) insertion/extraction in a non-aqueous electrolyte. (See FIG. 1). For example, an energy density of 147 Wh/kg at 150 W/kg may be achieved by coupling a graphene-based three-dimensional porous carbon cathode and a $Fe_3O_4$/graphene nanocomposite anode. However, with such prior art systems, high energy densities are only achieved at very low power densities, and energy densities generally decrease significantly with increasing power densities.

An ideal anode in a hybrid supercapacitor system should have the following features: 1) the working voltage should be low so that the system is able to fully utilize the voltage window of the electrolyte to enable high energy density; 2) the anode should have high specific capacity to increase the energy density; 3) the anode should have excellent rate capability to match the high-power cathode to achieve high power density; and, 4) the cycling life should be long to improve cycling stability of the hybrid system.

None of the anode materials used in the prior art of hybrid supercapacitor systems meets all of these requirements. For example, $Li_4Ti_5O_{12}$ and $TiO_2$ have good cycling stability but high voltage (1.5 V) and low capacity (around 200 mAh/g). Graphite, on the other hand, shows the lowest lithiation voltage (0.1 V), but also low capacity (370 mAh/g) and mediocre rate performance.

Silicon nanostructures, such as nanowires, nanotubes, and nano/micro-sized particles have been used in hybrid supercapacitors in an attempt to achieve the benefits described above, but preparation of Si nanostructures may involve chemical/physical vapor deposition or highly toxic HF etching, which may incur additional costs.

Consequently, a supercapacitor system with high energy density at high power density, along with long cycling life, has not yet been demonstrated with the prior art. One reason for this is due to a lack of high performance anodes employed with the supercapacitor system.

BRIEF SUMMARY OF THE INVENTION

Disclosed is a hybrid supercapacitor, including a carbon (C)-coated, boron (B)-doped silicon monoxide (SiO) anode ("high-performance Si-based anode") coupled with a highly porous spherical carbon (PSC) cathode. The hybrid supercapacitor exhibits high energy and power densities enabled by the high-performance Si-based anode. The cycling stability and rate performance of the anode material is further improved by size reduction, C-coating, and B-doping of commercial SiO. Furthermore, the high-performance Si-based anode can be produced without hydrofluoric acid (HF) etching, which may reduce costs.

DETAILED DESCRIPTION OF THE INVENTION

Figure 1:
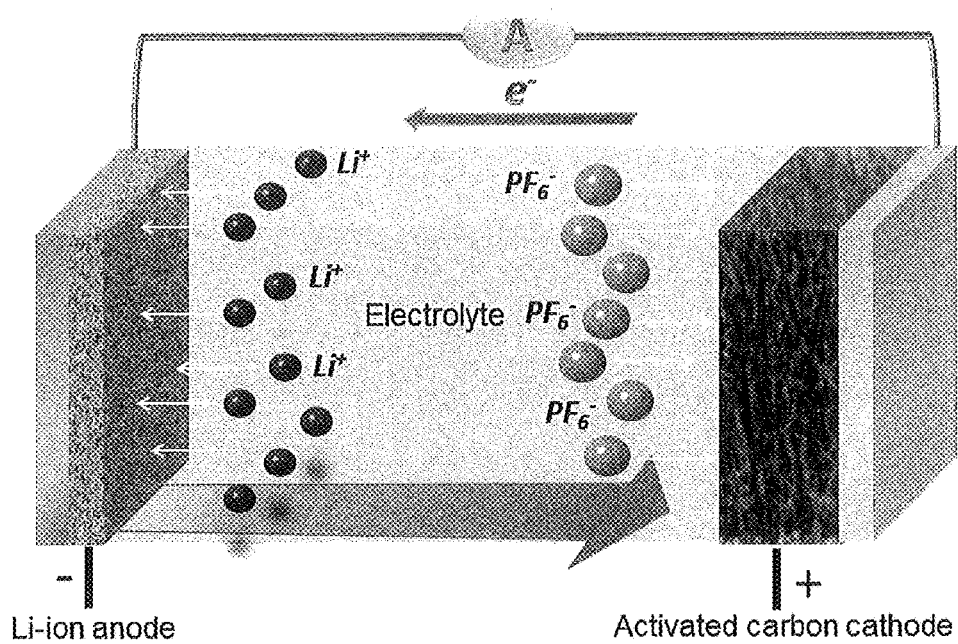
FIG. 1 shows a charging process of a supercapacitor of an embodiment as reported herein, using activated C as the cathode and a Li-insertion material as the anode.

Supercapacitors of the invention include at least three important elements. First, they include a lithium-alloy anode. The anode includes lithium and at least one material that can reversibly react with lithium, including, for example, but not limited to silicon, germanium, tin and so on. The lithium-alloy anode is doped with boron.

Supercapacitors of embodiments of the invention also include a carbon cathode. The carbon is a "porous" carbon that is capable of absorption/desorption of lithium ions and/or anions.

Supercapacitors as reported herein also include an electrolyte. Suitable electrolytes include, for example, but are not limited to an aprotic organic solution of a lithium salt.

Although not wishing to be bound by theory, the applicants will now discuss various relationships that may be applicable to supercapacitors of embodiments of the invention. Assuming a strictly linear charge/discharge slope without voltage drop, the energy and power densities of a hybrid super capacitor can be calculated by the following equations:

$$E = \frac{1}{2}(V_1 + V_2)I\Delta t \quad (1)$$

$$P = \frac{E}{\Delta t} \quad (2)$$

where E, P, $V_1$, $V_2$, I, and $\Delta t$ are the energy density, power density, lower and upper limits of the voltage window, current density, and discharge duration, respectively. According to these equations, to achieve high energy and power densities requires high operating voltage ($V_1+V_2$), high rate capability (which allows for high current density), and high capacity (which gives long discharge duration). Because the anode typically undergoes lithiation during charging of the hybrid supercapacitor, a lower anode lithiation voltage may enable a higher $V_2$, and thus may lead to higher energy and power densities if other parameters are unchanged.

Due to the fact that Faradaic anodes usually suffer from shorter cycling lives compared to capacitive cathodes, good anode cycling stability, in addition to high $V_2$, may be a desirable feature for long cycling life of the hybrid supercapacitor.

Si is a promising anode material candidate for hybrid supercapacitors because of its low lithiation potential (<0.5 V) and high specific capacity (>3500 mAh/g). However, Si may suffer from fast capacity fading caused by its large volume change (>300%) during lithiation/delithiation. In addition, Si may have low electronic conductivity due to its intrinsic semiconductor nature, which tends to limit its rate capability. Nonetheless, preparing Si-based anodes with long cycling life and high power density may be an effective means to produce Si-containing hybrid supercapacitors.

We have found that Si-based anodes exhibiting the above-referenced desired properties may be achieved by taking SiO and preforming size reduction, boron doping ("B-doping"), and carbon coating ("C-coating") to generate a high-performance Si-based anode. A hybrid supercapacitor including the high-performance Si-based anode and a PSC cathode in electrolyte containing Li salts may generate a hybrid supercapacitor system exhibiting high energy and power densities. The cycling stability and rate performance of the hybrid supercapacitor system may be further improved by size reduction, B-doping, and C-coating of the high-performance Si-based anode. Furthermore, the high-performance Si-based anode may be generated without HF etching.

When used as a Li-ion battery anode, the resultant high-performance Si-based anode composite (B—Si/SiO$_2$/C) exhibits a capacity of 1279 mAh/g after 100 cycles at 0.6 A/g (92.7% capacity retention) and excellent high rate performance of 685 mAh/g at 6.4 A/g. Coupling the high-performance Si-based anode material with a PSC cathode may generate a high-voltage hybrid supercapacitor (B—Si/SiO$_2$/O/PSC) operating between 2.0-4.5 V with a high energy density of 128 Wh/kg at 1229 W/kg. Even at a high power density of 9704 W/kg, 89 Wh/kg can be retained. In addition, the hybrid supercapacitor may exhibit capacity retention of 70% after 6000 cycles at 1.6 A/g and a low self-discharge rate with voltage retention of 82% after 50 hours.

Figure 2A:
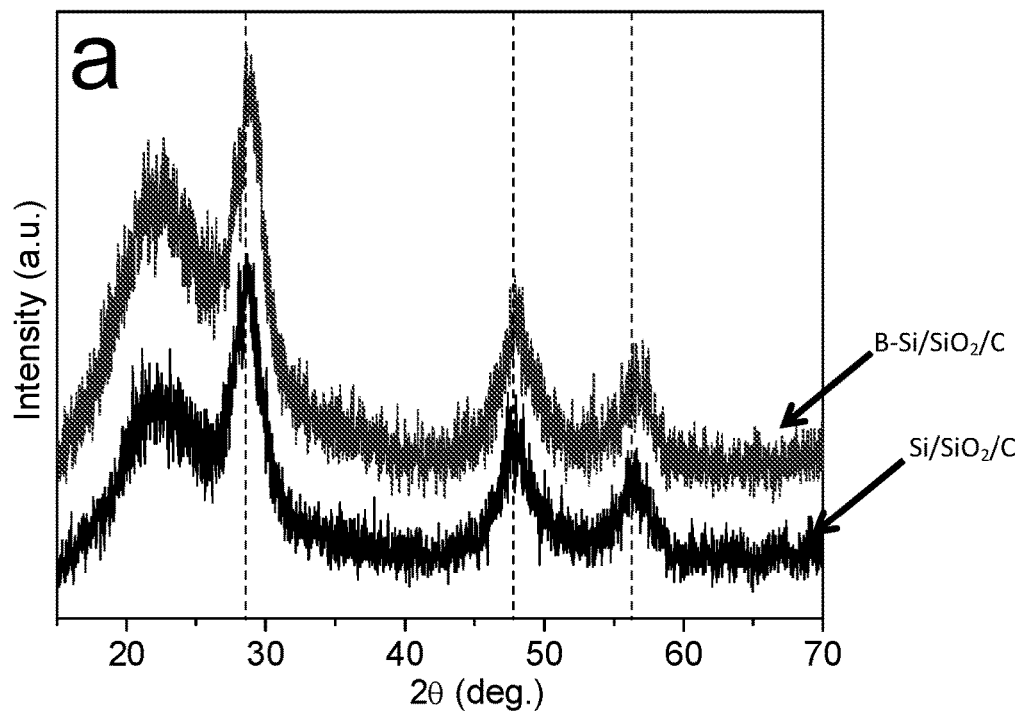
FIG. 2A shows XRD patterns of B—Si/$SiO_2$/C and Si/$SiO_2$/C.

FIG. 2A shows the X-ray diffraction (XRD) patterns of B—Si/SiO$_2$/C and Si/SiO$_2$/C. Both patterns contain the peaks associated with crystalline Si (JCPDS Card No. 27-1402) and amorphous SiO$_2$, which are formed by disproportionation of SiO during heat treatment of the samples. The average size (arithmetic mean of diameters) of Si nanocrystallites in both samples is estimated to be about 15 nm by the Debye-Scherrer equation. However, careful observation reveals a slight difference of Si peak positions between the two samples. The Si peaks of B—Si/SiO$_2$/C are at higher angles than those of Si/SiO$_2$/C due to the B-doped material having smaller lattice constants, indicating the replacement of Si atoms by smaller B atoms. In addition, no peaks of Si—B alloy are observed, supporting the conclusion that B doped into the Si.

Figure 2B:
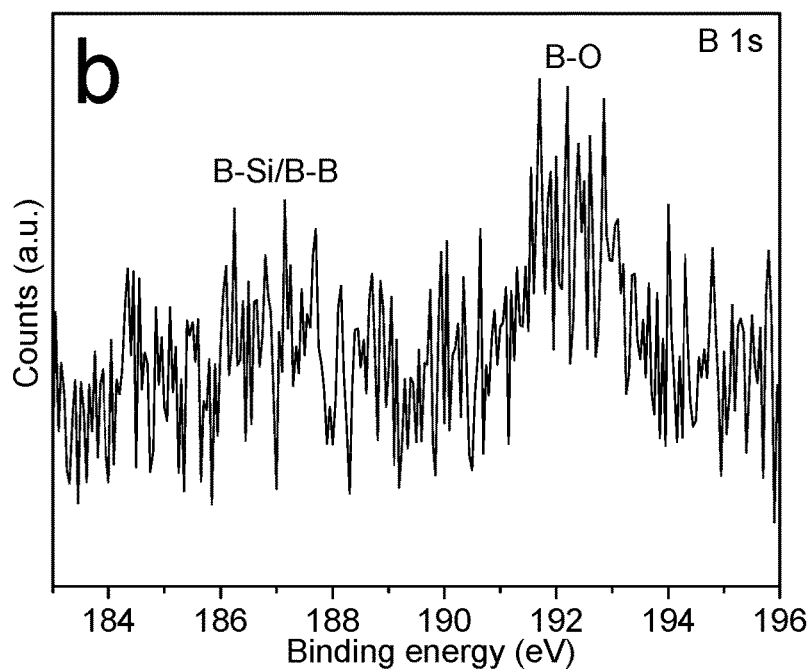
FIG. 2B shows B is XPS spectrum.
Figure 2C:
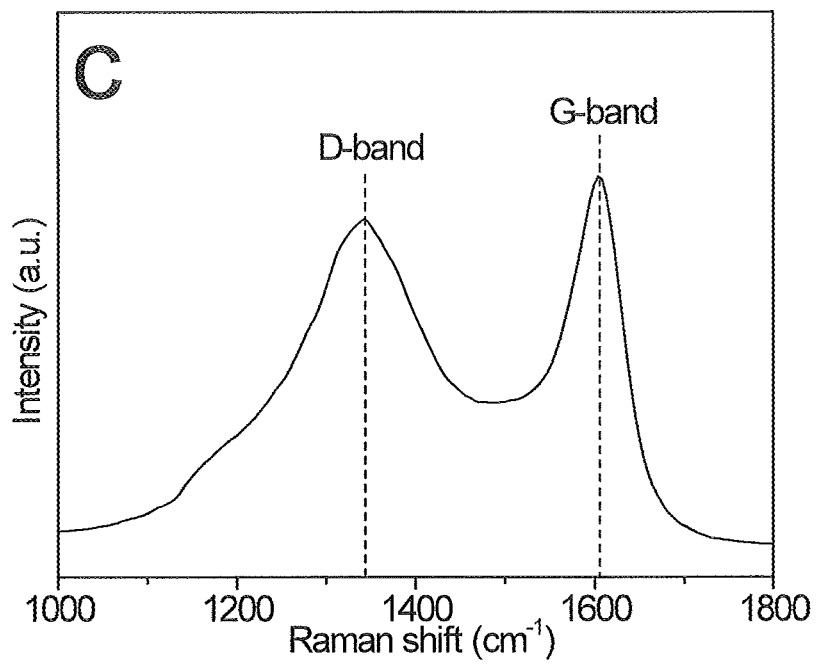
FIG. 2C shows Raman spectrum of B—Si/$SiO_2$/C.
Figure 2D:
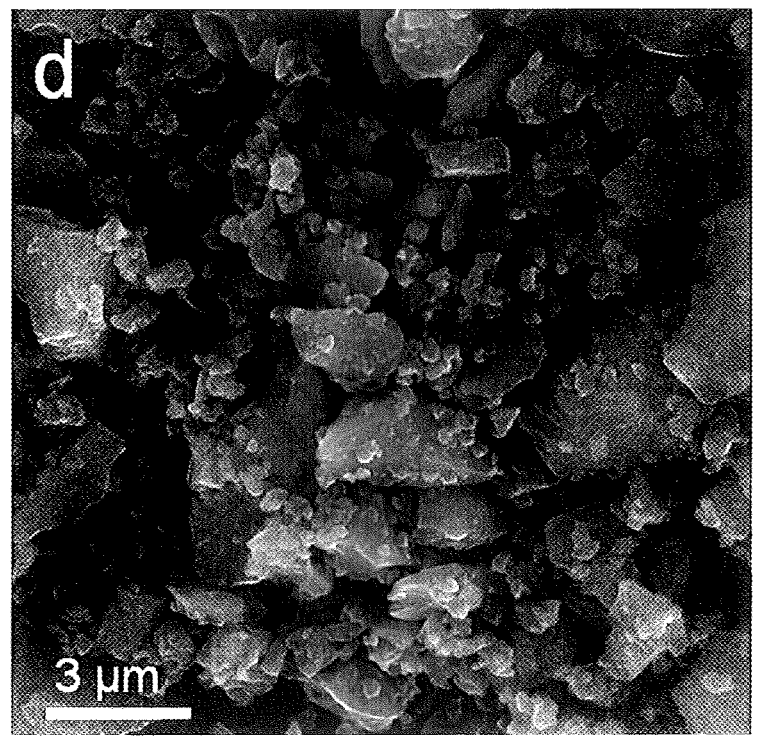
FIG. 2D shows a SEM image of B—Si/$SiO_2$/C.
Figure 2E:
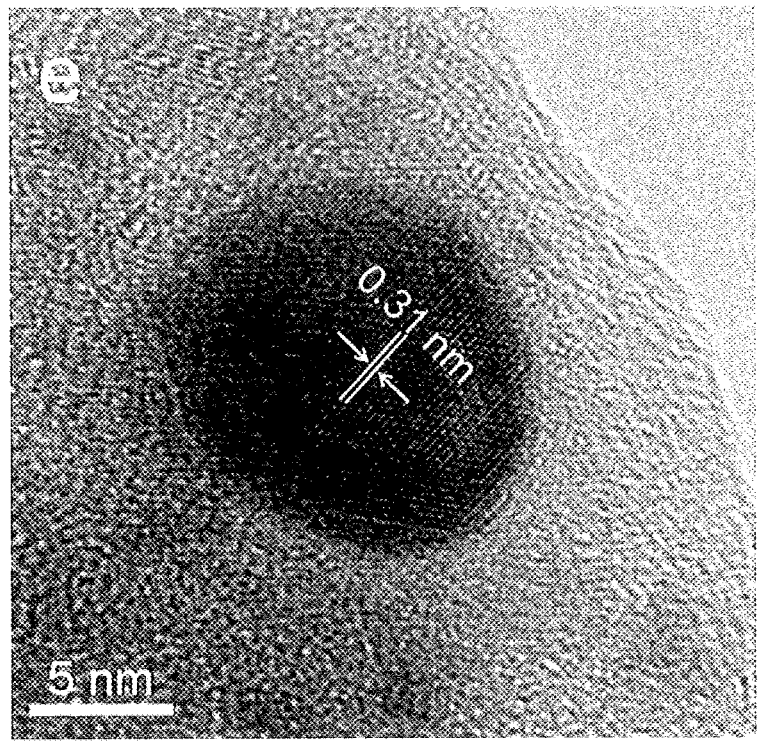
FIG. 2E shows a HRTEM image of B—Si/$SiO_2$.
Figure 6A:
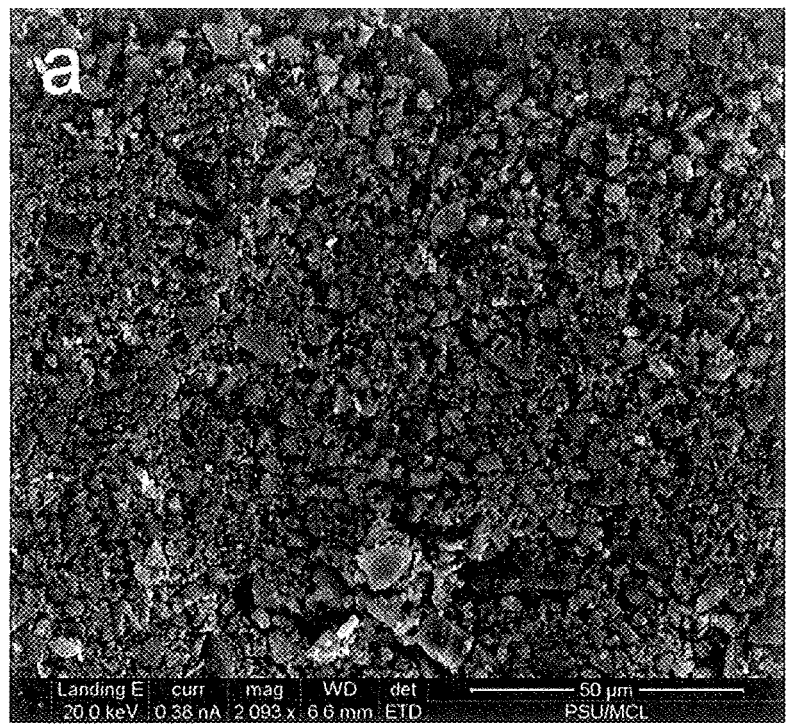
FIG. 6A and FIG. 6B show comparison by SEM of B—Si/SiO$_2$/C and B—Si/SiO$_2$/C-325, respectively.
Figure 6B:
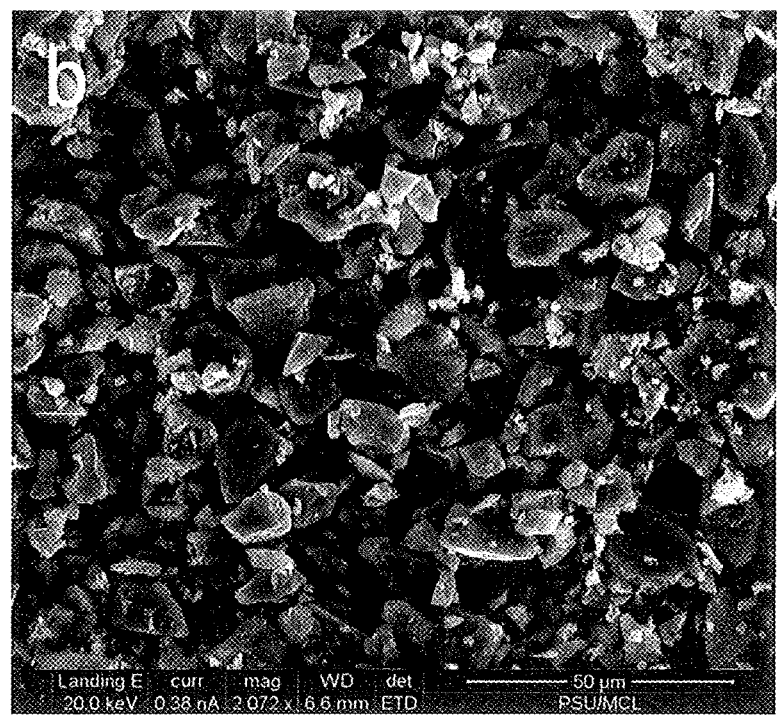

The B-doping can be examined by X-ray photoelectron spectroscopy (XPS). As shown in FIG. 2B, both a B—O peak (193 eV) and a weak B—B/B—Si peak (188/187 eV) are present, agreeing well with the above conclusion that B-doped Si nanocrystals embedded in the silicon dioxide matrix and serving as solid evidence of B-doping. Raman spectroscopy (see FIG. 2C) of B—Si/SiO$_2$/C shows two peaks at 1340 and 1605 cm$^{-1}$ that are attributed to the D (disordered) band and the G (graphite) band of C, indicating the presence of C formed by thermal decomposition of acetylene. The mass percentage of C in B—Si/SiO$_2$/C was found to be 3.5% by elemental analysis. In other embodiments the mass percentage of carbon may be, for example, 3% to 30%, 10%-20%, or 5% to 10%. The morphology, size, and structure of B—Si/SiO$_2$/C may be investigated by scanning electron microscopy (SEM) and transmission electron microscopy (TEM). As shown in the SEM image (see FIG. 2D), B—Si/SiO$_2$/C comprises micro-sized particles with an average size (arithmetic mean) of about 3 µm and sub-micron particles much smaller than the size (e.g., 20 µm—see FIG. 6) of the pristine SiO precursor before ball milling. Note, that ball milling may be used for size reduction (see Synthesis of B-doped Si/SiO$_2$/C Composite section below). The nanoscale structure of disproportionated SiO is shown in the high-resolution TEM (HRTEM) image of FIG. 2E. Lattice fringes with a d-spacing of 0.31 nm can clearly be seen (see FIG. 2E), corresponding to the (111) crystal planes of the Si. It is also clear that crystalline Si domains with size of around 15 nm are dispersed in an amorphous SiO$_2$ matrix, which could act as a buffer layer for volume change of Si during lithiation/delithiation and thus improve cycling stability (see FIG. 2E).

Figure 2F:
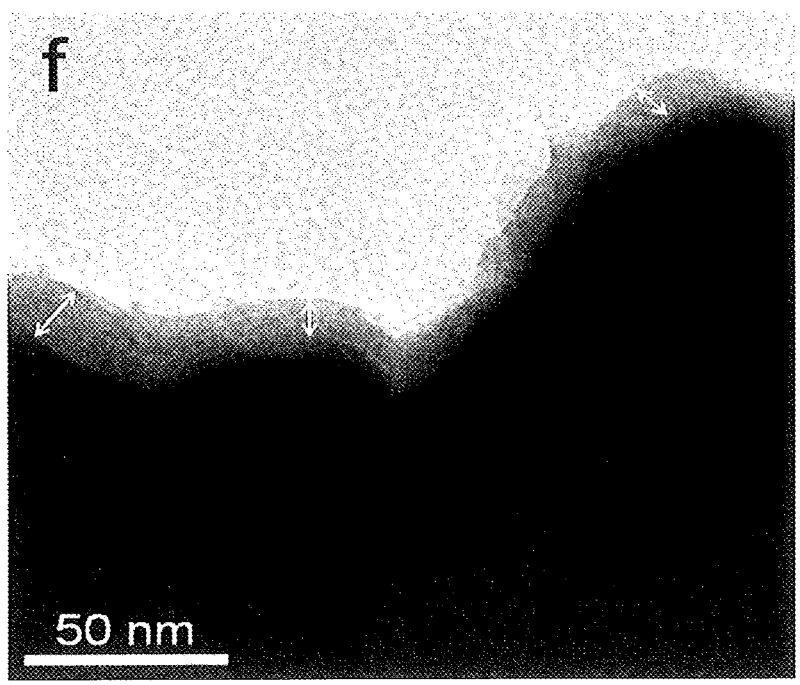
FIG. 2F shows a TEM image of B—Si/$SiO_2$/C.
Figure 7:
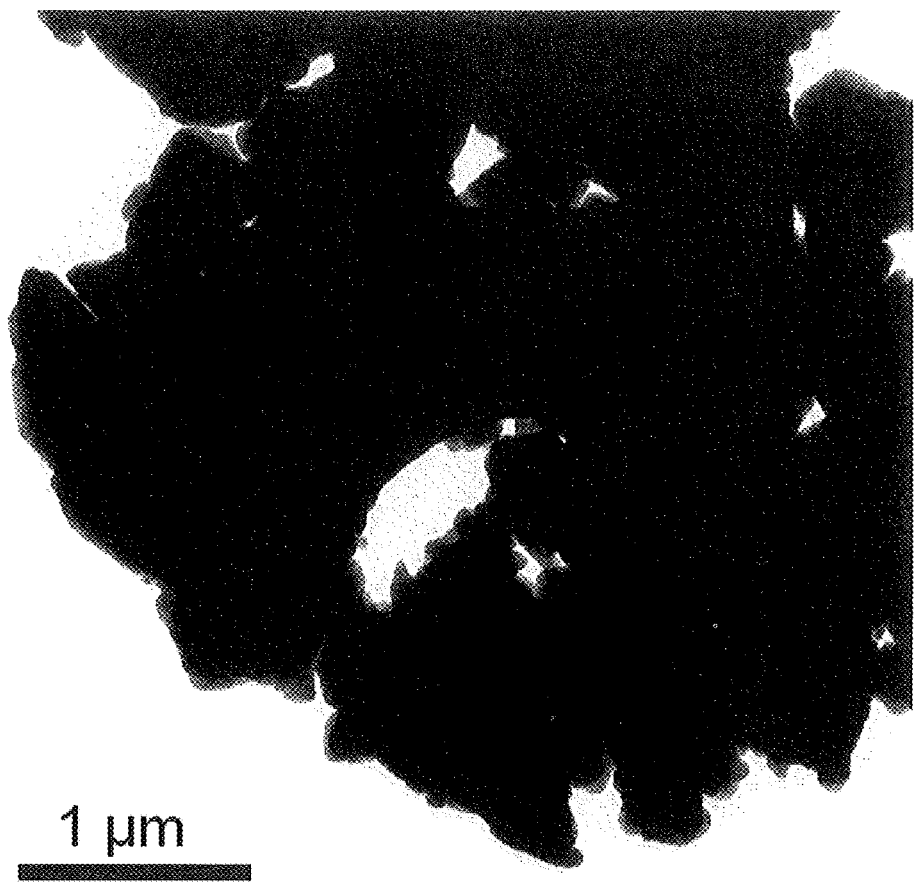
FIG. 7 is a low-magnification TEM of B—Si/SiO$_2$/C, showing a carbon coating layer.

FIG. 2F shows the TEM image of B—Si/SiO$_2$/C, in which the thickness of the C layer (marked by white arrows) is approximately 20-30 nm. A low-magnification TEM showing overall morphology with the C layer is shown in FIG. 7.

The influence of size reduction of the SiO precursor and B-doping on the electrochemical performance of the resultant products may be evaluated by galvanostatic cycling in Li-ion half-cells. For comparison, B-doped Si/SiO$_2$/C using SiO (which was not ball-milled—B—Si/SiO$_2$/C-325), and undoped Si/SiO$_2$/C (using ball-milled SiO—Si/SiO$_2$/C) were prepared. These control samples had similar carbon content (3.5 wt %) to B—Si/SiO$_2$/C.

Figure 3A:
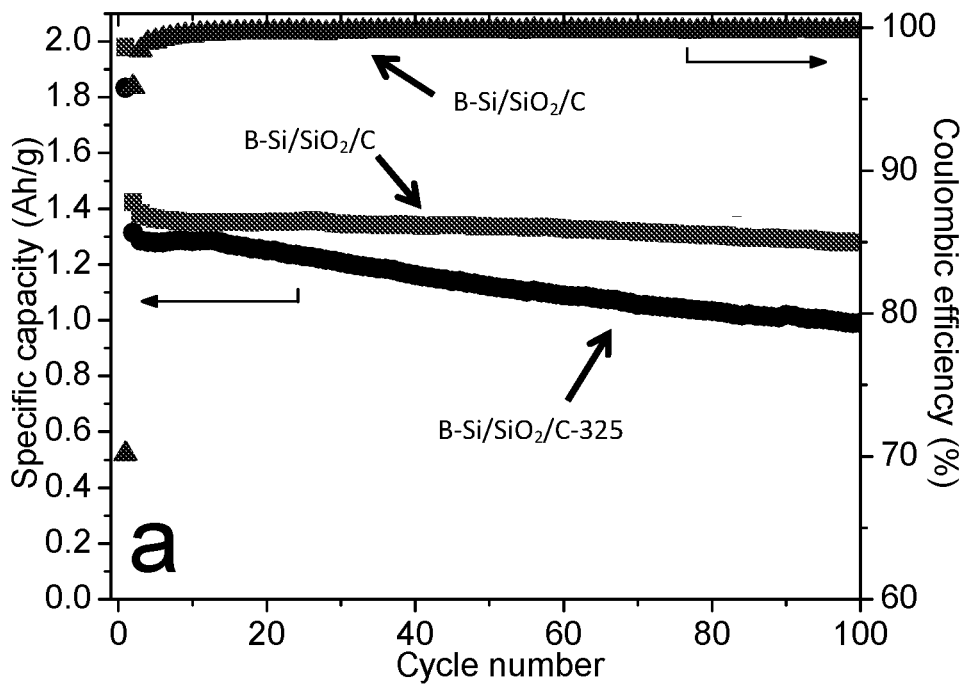
FIG. 3A shows cycling performance of B—Si/$SiO_2$/C and B—Si/$SiO_2$/C-325 at 600 mA/g, after the first two cycles of activation at 300 mA/g.

FIG. 3A shows the cycling performance of B—Si/SiO$_2$/C and B—Si/SiO$_2$/C-325 at a current density of 600 mA/g with the first two cycles activated at 300 mA/g. It is clear that B—Si/SiO$_2$/C exhibits better cycling stability than B—Si/SiO$_2$/C-325. A capacity of 1279 mAh/g can be obtained by B—Si/SiO$_2$/C after 100 cycles, equating to 92.7% capacity retention (based on the lithiation capacity of the 3$^{rd}$ cycle), while B—Si/SiO$_2$/C-325 only delivered 990 mAh/g after 100 cycles (75% of its initial capacity). B—Si/SiO$_2$/C also exhibits higher specific capacity during its first several cycles as compared to B—Si/SiO$_2$/C-325, indicating that size reduction may lead to short charge transport paths and thus increased material utilization.

Figure 3B:
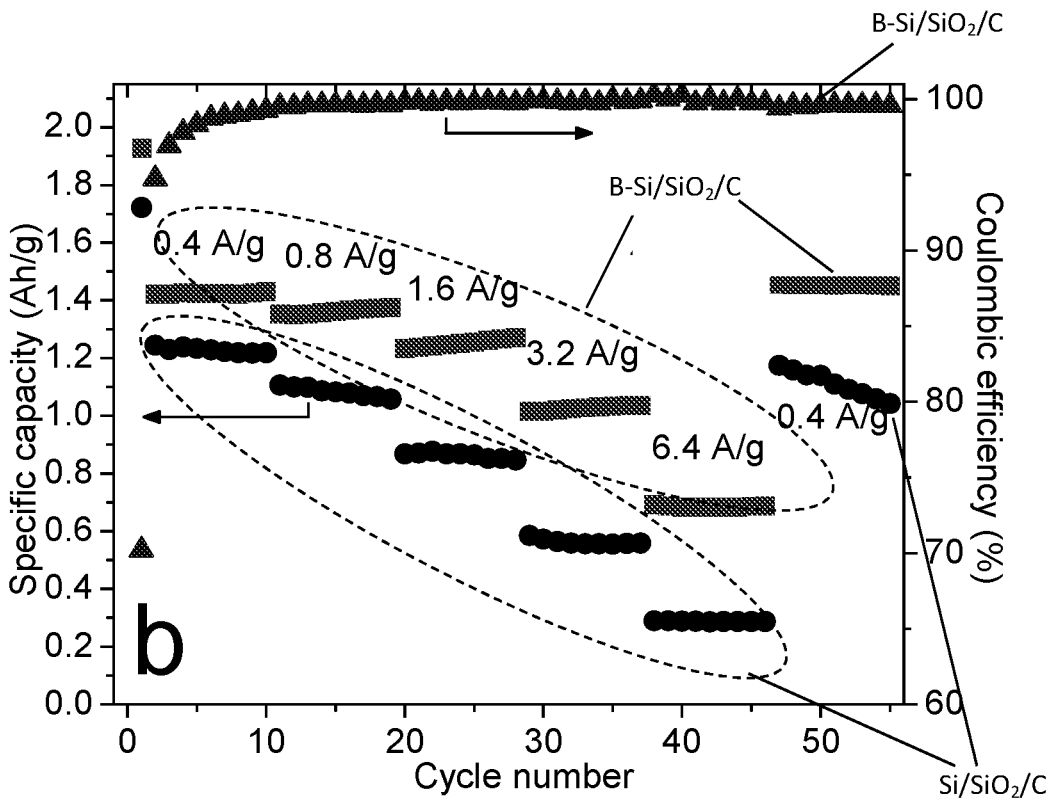
FIG. 3B shows rate performance of B—Si/$SiO_2$/C and Si/$SiO_2$/C.

Another notable feature of B—Si/SiO$_2$/C is its high coulombic efficiency (CE) during cycling. B—Si/SiO$_2$/C shows an acceptable first cycle CE of 71%. The CE quickly rises to 99.5% and 99.7% after 9 and 20 cycles, respectively, and thereafter remains at that level. The average CE (arithmetic mean) from the 2$^{nd}$ to 100$^{th}$ cycle is 99.67%, which is rarely reported for Si-based anode materials. The doping effects on reduced-size Si/SiO$_2$/C may be examined by charge/discharge at different current densities. As shown in FIG. 3B, the difference in the specific capacities of doped and undoped ball-milled Si/SiO$_2$/C becomes more and more pronounced with increasing current density. At a high current density of 6.4 A/g, B—Si/SiO$_2$/C delivers a capacity of 685 mAh/g, which is 2.4 times that of Si/SiO$_2$/C (286 mAh/g). After the current density was restored to 400 mA/g, B—Si/SiO$_2$/C showed excellent reversibility, with a capacity similar to its initial capacity, while Si/SiO$_2$/C showed lower capacity and poor stability.

Figure 3C:
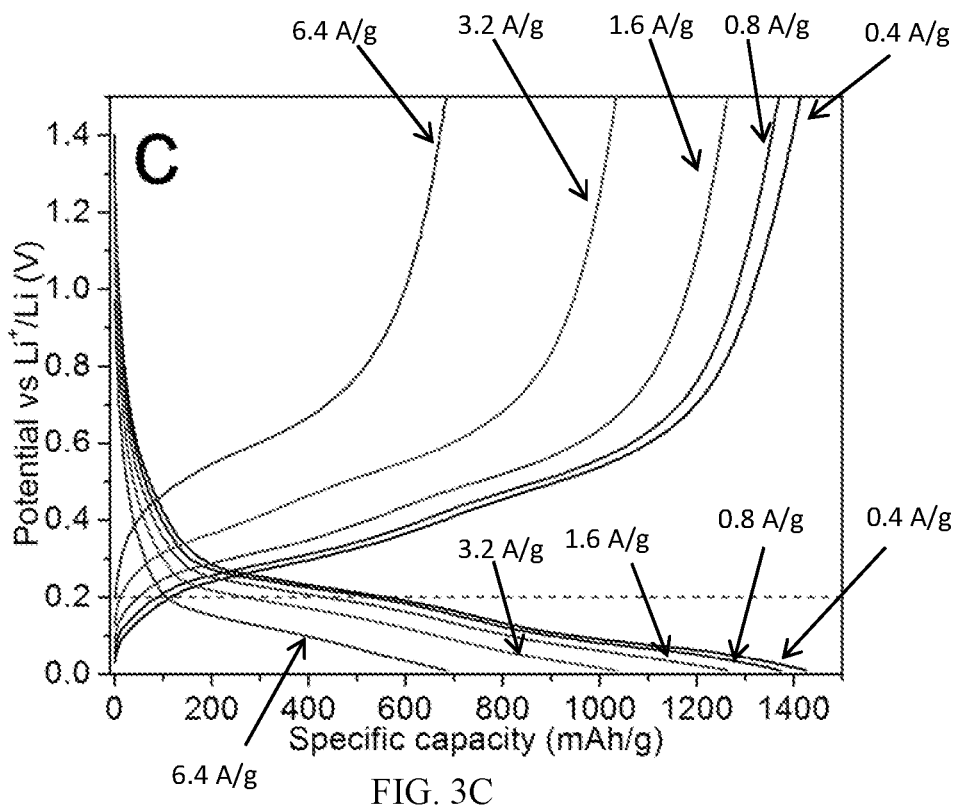
FIG. 3C and FIG. 3D show voltage profiles of B—Si/$SiO_2$/C and PSC at different current densities, respectively.
Figure 8:
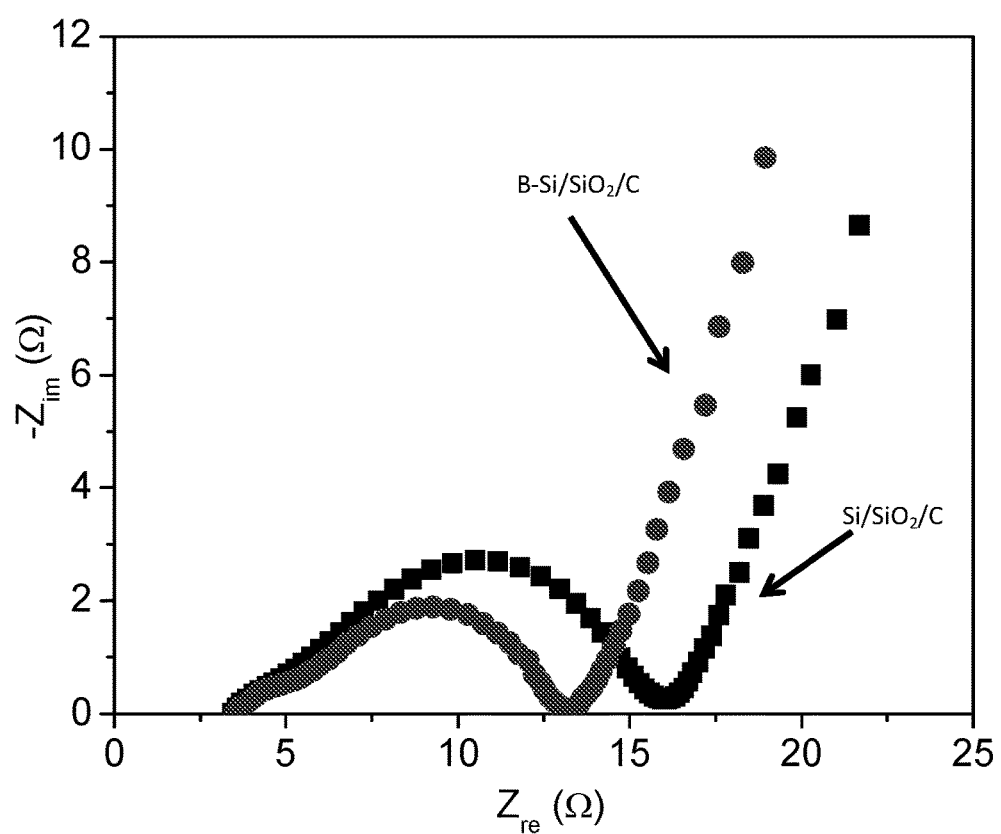
FIG. 8 shows impedance spectra of B—Si/SiO$_2$/C and Si/SiO$_2$/C in a lithiated state with a voltage of 0.2 V.

The improved rate performance by B-doping may be ascribed to a lower charge transfer resistance, as evidenced by electrochemical impedance spectroscopy (EIS). (See FIG. 8). The B—Si/SiO$_2$/C has a smaller semicircle plot formation in the high-to-medium frequency region, which is generally ascribed to having a lower charge transfer resistance. It is worth noting that the CE of B—Si/SiO$_2$/C remains around 99.7% even at high rates. For example, FIG. 3C shows voltage profiles of B—Si/SiO$_2$/C at different rates, and a relatively flat lithiation plateau below 0.3 V can be observed in all profiles. As revealed by FIG. 3A, a large portion of capacity is reserved even under lower voltage (e.g., 0.2 V), as marked by dash line. As an extreme, the capacity is 108 mAh/g when B—Si/SiO$_2$/C was lithiated to 0.2 V at 6.4 A/g, giving 577 mAh/g that could be used when lithiated B—Si/SiO$_2$/C is coupled as an anode in a hybrid supercapacitor. The large capacity reservoir at high current density, combined with the low voltage plateau, may enable a large voltage window in a hybrid supercapacitor system, even approaching the upper limit of electrolyte voltage window.

Figure 3D:
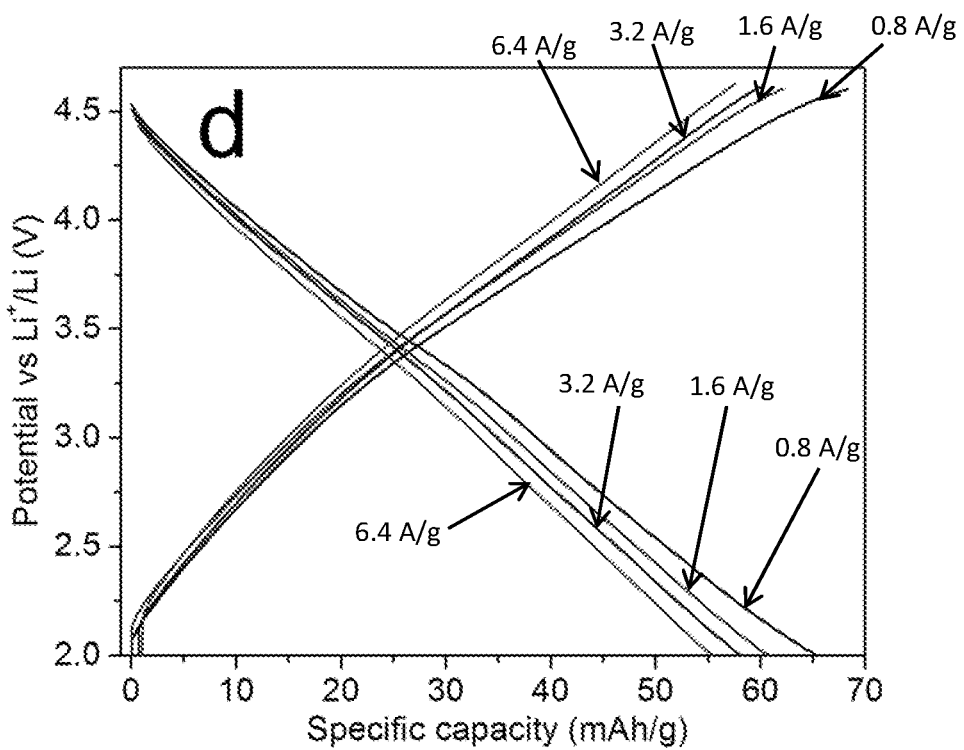
Figure 9:
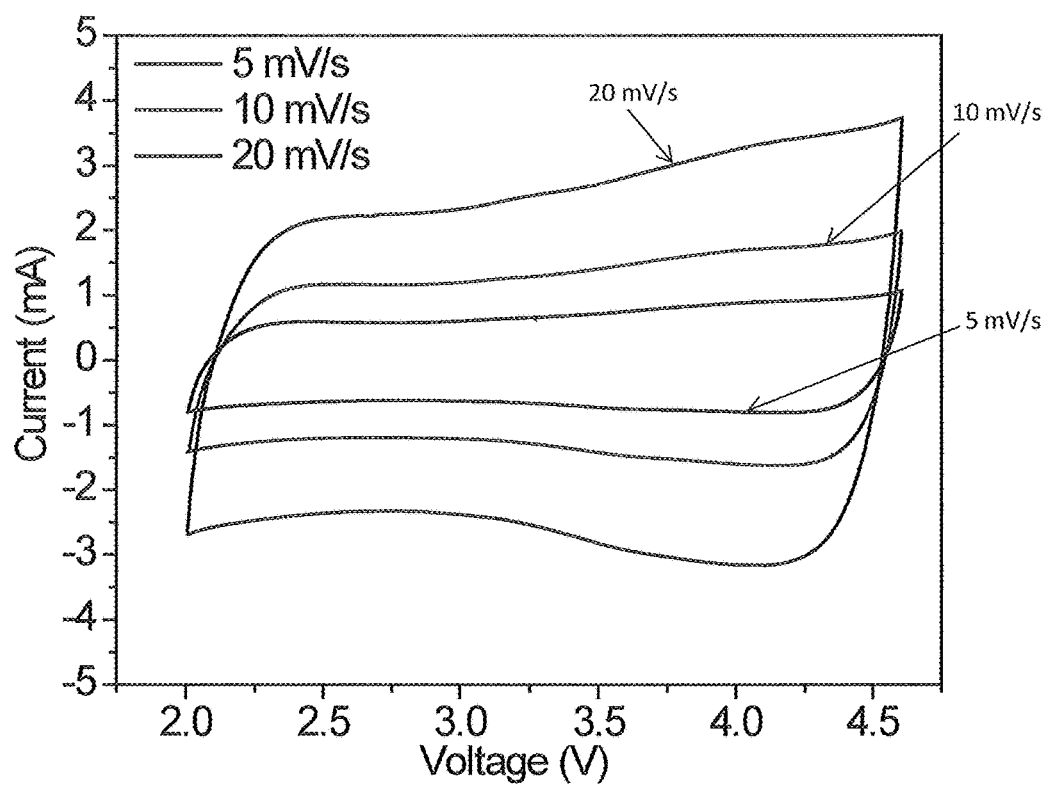
FIG. 9 shows CV curves of PSC from 2V to 4.6 V in a Li half-cell.

The physical properties of PSC feature a hierarchical mesoporous structure with mesopores ranging from 5 to 25 nm in diameter, a high surface area of 1014 m$^2$/g, and a high pore volume of 2.5 cm$^3$/g, which make it a good candidate for the cathode material in the hybrid supercapacitor system. FIG. 3D shows the results of evaluating PSC in a Li half-cell over a potential range from 2.0 to 4.6 V. Capacities vary from 65 to 55 mAh/g, at 0.8-6.4 A/g. Linear charge/discharge profiles were observed at all current densities, indicating capacitive behavior with the adsorption/desorption of ions on the surface. The cyclic voltammetry (CV) curves of the PSC (see FIG. 9) show quasi-rectangular shapes, which are close to the ideal capacitive behavior.

Based on the electrochemical characteristics of B—Si/SiO$_2$/C and PSC, the following guidelines may be used for design and evaluation of the B—Si/SiO$_2$/O/PSC hybrid supercapacitor system. B—Si/SiO$_2$/C may be cycled 10 times at 400 mAh/g in a Li half-cell to achieve high efficiency and then lithiated to 0.2 V. Thereafter, the lithiated B—Si/SiO$_2$/C electrode may be coupled with a fresh PSC cathode to fabricate a hybrid supercapacitor (B—Si/SiO$_2$/O/PSC). The mass ratio of PSC to B—Si/SiO$_2$/C may be set at 2:1 to obtain long cycling life, which may provide a fair margin for gradual consumption of the Si anode due to structural degradation during extended cycling. The voltage window of 2.0-4.5 V may be used to avoid both oxidative decomposition of electrolytes and possible Li intercalation into the C-based cathode (typically occurring under 2.0 V).

Figure 4A:
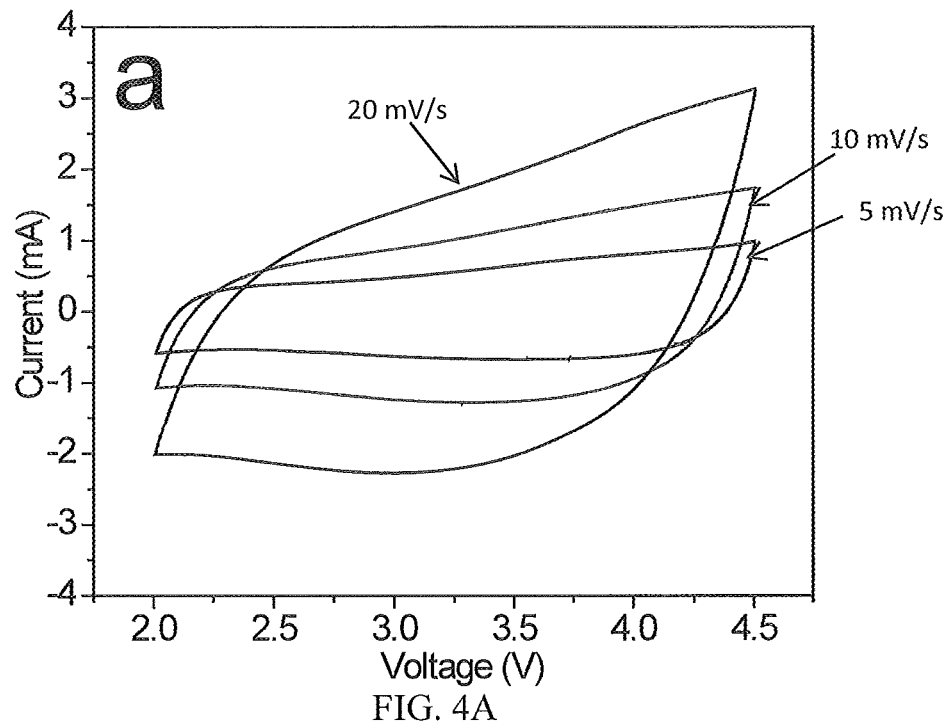
FIG. 4A shows CV curves of the B—Si/$SiO_2$/CHPSC hybrid supercapacitor.
Figure 4B:
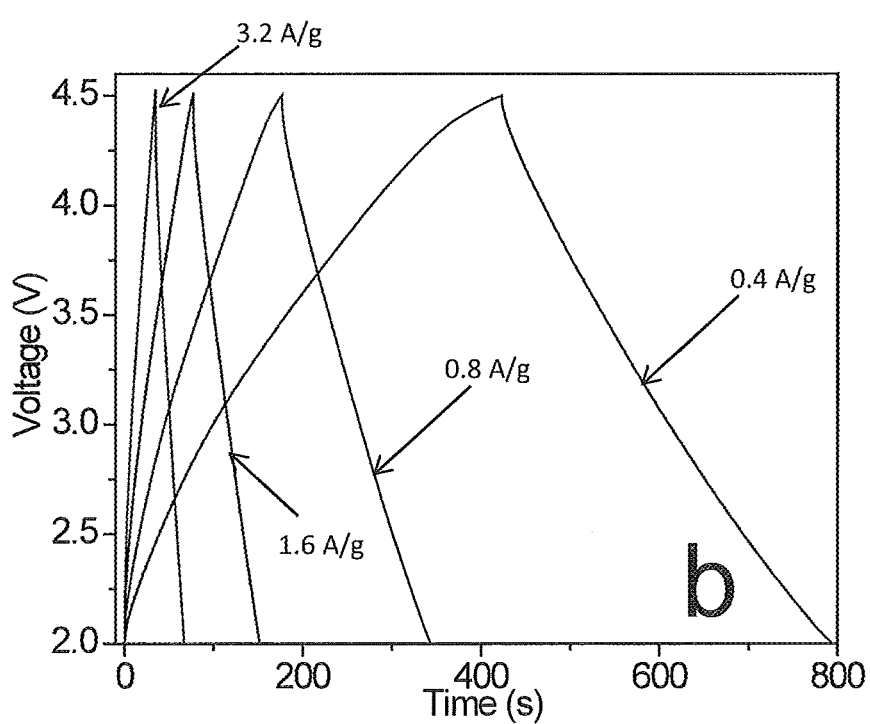
FIG. 4B shows galvanostatic charge-discharge curves of the B—Si/$SiO_2$/O/PSC hybrid supercapacitor at different current densities.

The CV curves of the hybrid supercapacitor from 2.0 to 4.5 V are shown in FIG. 4A. As the scan rate increases, the curves gradually deviate from the ideal rectangular shape due to the overlapping effects of capacitive behavior from the cathode and Faradaic behavior from the anode. FIG. 4B shows the voltage profiles at different current densities. Note that the current densities are based on the total mass of active material on both the cathode and the anode. The curves show little deviation from the linear slope of an ideal supercapacitor, which may be due to the relatively flat charge/discharge plateau of the Si-based anode.

Figure 4C:
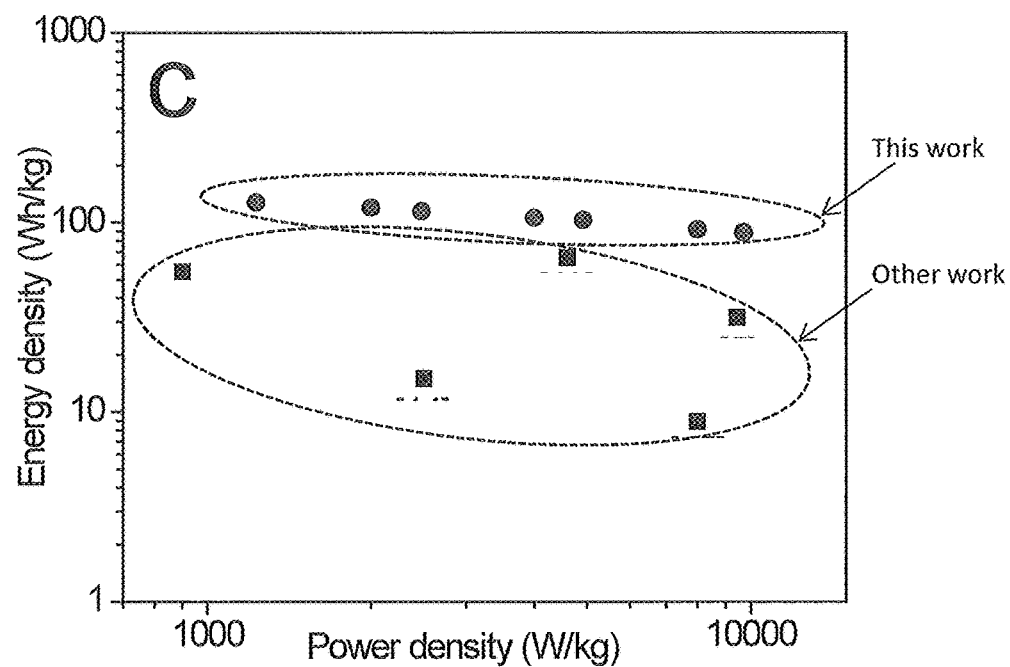
FIG. 4C shows a Ragone plot of the B—Si/$SiO_2$/O/PSC hybrid supercapacitor in comparison with other work.

The energy and power densities of the hybrid supercapacitor may be calculated based on the curves of FIG. 4A. As shown in FIG. 4C, a high energy density of 128 Wh/kg can be achieved at a power density of 1229 W/kg. Even at an ultra-high power density of 9704 W/kg, which is on a par with conventional supercapacitors, the hybrid supercapacitor can still deliver 89 Wh/kg. Therefore, the B—Si/SiO$_2$/O/PSC hybrid supercapacitor system exhibits both high energy and high power densities. This is further demonstrated in Table I.

TABLE I

Power and Energy Densities of the B—Si/SiO2/C//PSC Hybrid
Supercapacitor Obtained with Different Voltage Windows

|  |  | Current density (A/g) | | | |
|---|---|---|---|---|---|
|  |  | 0.4 | 0.8 | 1.6 | 3.2 |
| Power density (W/kg) | 2.0-4.5 V | 1229 | 2473 | 4925 | 9704 |
|  | 2.0-4.0 V | 1200 | 2388 | 4736 | 9364 |
| Energy density (Wh/kg) | 2.0-4.5 V | 128 | 115 | 103 | 89 |
|  | 2.0-4.0 V | 64 | 60 | 56 | 51 |

Figure 4D:
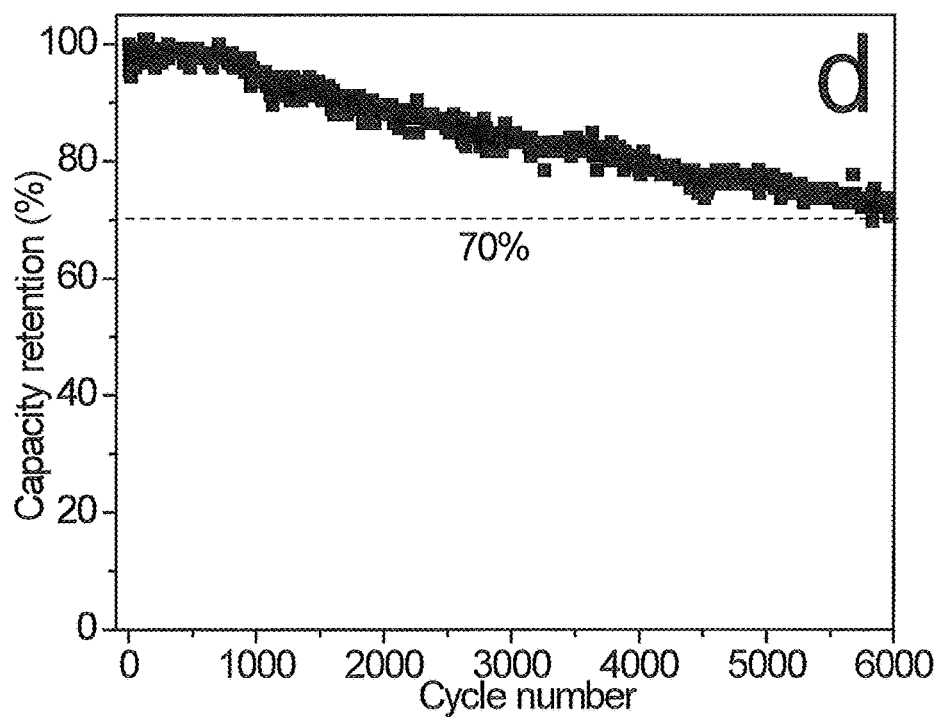
FIG. 4D shows cycling performance of the B—Si/SiO$_2$/C//PSC hybrid supercapacitor.

Given that the mass percentage of active materials in commercial energy storage devices is about 35-40%, the gravimetric energy density of a device using the B—Si/SiO$_2$/C//PSC system could reach 32 Wh/kg at 3396 W/kg. In addition, the hybrid supercapacitor device could have high volumetric energy and power densities thanks to the high tap densities of both PSC (0.5 g/cm$^3$) and B—Si/SiO$_2$/C (0.7 g/cm$^3$), which may stem from their micron-scale particle size. Moreover, the hybrid supercapacitor system may demonstrate long-term cycling stability. This is shown in FIG. 4D, where the capacity retention is 70% after 6000 cycles with the cycling performance of the hybrid supercapacitor at 1.6 A/g.

Figure 5:
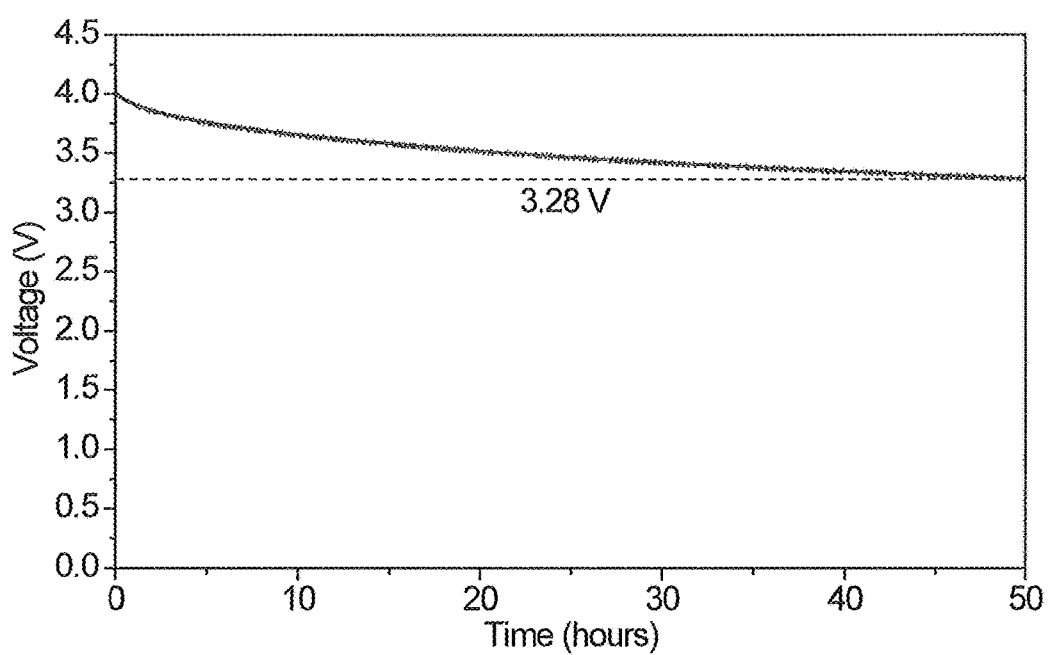
FIG. 5 shows a self-discharge curve of the B—Si/SiO$_2$/C/PSC hybrid supercapacitor charged to 4.0 V at 100 mA/g followed by constant-voltage charging at 4.0 V for 1 hour at room temperature.

The self-discharge behavior of supercapacitors is typically a concern when attempting to use supercapacitors in practical applications. For instance, conventional supercapacitors suffer from a higher self-discharge rate than Li-ion batteries. Yet, configuring the hi-performance Si-based anode as a Li-active anode within the hybrid supercapacitor system may reduce the self-discharge rate. For example, with a high-performance Si-based Li-active anode in the supercapacitor system, the hybrid supercapacitor was charged to 4.0 V at 100 mA/g, further charged at a constant potential of 4.0 V for 1 hour, and then allowed to undergo self-discharge (all at room temperature). The open circuit voltage as a function of time was measured, which is shown in FIG. 5. The voltage dropped to 3.28 V over 50 hours with a faster rate at the beginning, corresponding to 18% decay. This rate of decay is much lower than those of the commercial high-voltage (e.g., 3.5V) supercapacitors (50% over 8 hours) and graphene-based micro-supercapacitors recently reported (50% over 13 hours).

In summary, a hybrid supercapacitor has been generated by coupling a PSC cathode and a high-performance Si-based anode. The high-performance Si-based anode has good cycling stability and rate performance, delivering a capacity of 685 mAh/g even at a high rate of 6.4 A/g. In addition, the low working voltage (~0.2 V) of Si grants the hybrid supercapacitor a high voltage window of 2.0-4.5 V. As a result, the hybrid supercapacitor exhibits a high energy density of 128 Wh/kg at 1229 W/kg.

Even when power density increases to the level of a conventional supercapacitor (9704 W/kg), 89 Wh/kg can be obtained. Moreover, the hybrid supercapacitor system can achieve a long cycling life, with 70% capacity retention after 6000 cycles. The hybrid supercapacitor also features a low self-discharge rate, with voltage retention of 82% after 50 hours. The present findings demonstrate that incorporating high-performance Si-based anodes is an effective approach to boost the energy and power densities of hybrid supercapacitors.

Examples

Synthesis of B-Doped Si/SiO$_2$/C Composite

Commercially available SiO powder (e.g., Sigma Aldrich® 325 mesh) may be used as precursor. For size reduction, SiO powder may be subject to planetary ball-milling for 12 hours at a speed of 400 rpm. The B-doping may be carried out in a horizontal quartz tube. A mixture of the SiO powder and B$_2$O$_3$ powder (Alfa Aesar®) with 20:1 molar ratio of Si:B may be used as the starting material. In a typical process, high-purity argon (Ar) may be introduced at a flow rate of 1500 sccm for 20 min to purge the system. Afterwards the flow rate may be reduced to 100 sccm and the tube may be heated to 950° C. with a ramping rate of 10° C./min, and kept at 950° C. for 5 hours.

The samples may be taken out of the tube at temperatures below 40° C. Carbon coating may be done by thermal decomposition of acetylene gas at 700° C. for 30 minutes in a quartz furnace. The mixture of acetylene and high-purity Ar (Ar:acetylene=9:1 by volume) may be introduced at a flow rate of 100 sccm.

Synthesis of PSC Microspheres:

PSC microspheres may be prepared according to the methods disclosed in T. Xu, J. Song, M. L. Gordin, H. Sohn, Z. Yu, S. Chen, D. Wang, *ACS Applied Materials & Interfaces* 2013, 5, 11355, which is incorporated by herein in its entirety.

In a typical preparation of PSC, 3.3 g of F127 block copolymer may be first dissolved in 20 g of ethanol with 2.0 g of hydrogen chloride (HCl) (0.2 M). Then, 4.16 g of tetraethyl orthosilicate (TEOS) may be added, and the clear solution may be stirred for 0.5 hours at 40° C. Next, 11 g of resin solution (20 wt %) and 12 mL of colloidal silica ST-0 may be added in sequence and further stirred for 1 hour. Meanwhile, 3 g of emulsifier, Span®80, may be dispersed in a 300 mL paraffin oil bath at 40° C. The ethanol solution may be added into the oil bath for emulsification by vigorous stirring. The temperature may be kept at 40° C. for 1 hour and tuned to 100° C. to evaporate ethanol and thermopolymerize overnight.

The as-made products may be filtered and washed with hexane several times before drying in air. Calcination can be carried out sequentially in a tubular furnace, first at 350° C. for 3 hours and next at 900° C. for 2 hours under Ar flow to form a PSC—SiO$_2$ nanocomposite. The heating rate may be 1° C./min below 600° C. and 5° C./min above 600° C. The PSC—SiO$_2$ nanocomposite may be immersed in 2 wt % HF solutions to remove silica, leaving PSC carbon spheres. The as-made product may be washed by distilled water several times and dried at 80° C. in an oven.

Characterization:

The obtained samples may be characterized on a Rigaku Dmax-2000 X-ray powder diffractometer with Cu Kα radiation ($\lambda$=1.5418 Å). The operating voltage and current can be kept at 40 kV and 30 mA, respectively. The size and morphology of the as-synthesized products can be determined by a JEOL-1200 TEM, FEI Nova NanoSEM 630 SEM, and JEOL-2010F HRTEM. XPS may be conducted with a Kratos Analytical Axis Ultra XPS. Raman spectroscopy may be conducted with a WITec CMR200.

Electrochemical Measurements:

The electrochemical experiments may be performed using 2016-type coin cells, which can be assembled in an Ar-filled dry glovebox (MBraun, Inc.). For half-cell testing, PSC and B—Si/SiO$_2$/C electrodes may be used as the working electrodes and the Li metal may be used as the counter and/or reference electrode. PSC electrodes may be prepared by casting a slurry comprising 80 wt % of active material, 10 wt % of Super P® carbon black, and 10 wt % of polyvinylidene fluoride binder on carbon-coated aluminum foil.

B—Si/SiO$_2$/C electrodes can be prepared by mixing 70 wt % of active material, 15 wt % of Super P® carbon black, and 15 wt % of poly(acrylic acid) (PAA) binder. 1 mol/L LiPF6 in a mixture of ethylene carbonate, diethyl carbonate and dimethyl carbonate (EC:DEC:DMC, 2:1:2 by vol.) and 10 wt % fluoroethylene carbonate (FEC) can be used as the electrolyte (Novolyte Technologies, Independence, Ohio).

The hybrid supercapacitor may be fabricated by coupling a prelithiated B—Si/SiO$_2$/C electrode (cycled 10 times, ending in a lithiated state at 0.2 V) and a fresh PSC electrode. The mass ratio of PSC to B—Si/SiO$_2$/C may be 2:1.

The electrochemical performance can be evaluated by galvanostatic charge/discharge cycling on an Arbin BT-2000 battery tester at room temperature under different current densities. The voltage ranges for the PSC electrode and the B—Si/SiO$_2$/C electrode can be 2.0-4.5 V and 0.01-1.5 V versus Li+/Li, respectively. The hybrid supercapacitor may be measured in the voltage range from 2.0 to 4.5 V versus Li+/Li. The current density may be calculated based on the total mass of active materials on both the cathode and the anode. CV measurements can be carried out on a Solartron SI 1287 electrochemical interface. EIS can be carried out by applying a perturbation voltage of 5 mV between 10 mHz and 100 kHz using a Solartron SI 1260 impedance analyzer. The energy density (E) and power density (P) of the hybrid supercapacitor may be calculated according to the following equations:

$$E = \int_{t1}^{t2} IVdt \quad (3)$$

$$P = \frac{E}{t_2 - t_1} \quad (4)$$

where E (Wh/kg), V (V), I (A/kg), $t_1$ and $t_2$ (h) and P (W/kg) are the energy density, voltage, constant current density, discharge start and end time, and power density, respectively.

Figure 10:
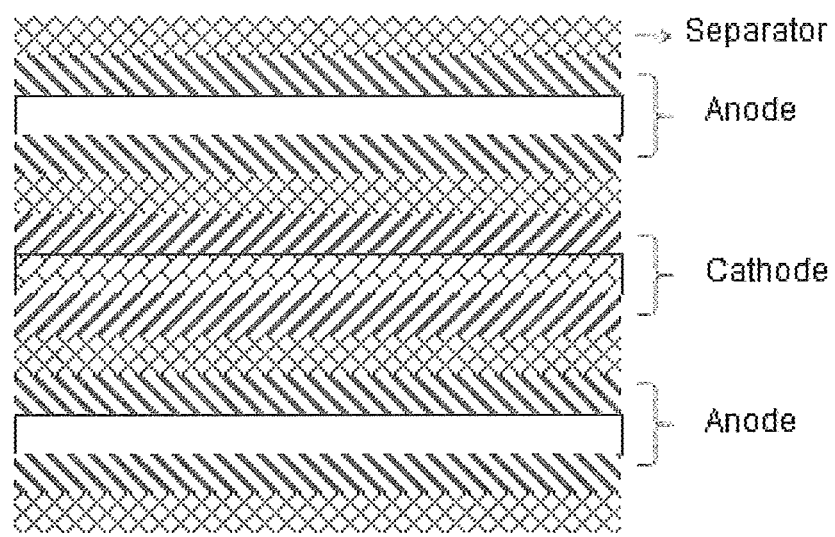
FIG. 10 shows a structure of the hybrid supercapacitor system including the lithium-alloy anode and carbon-based anode.

As shown in FIG. 10, the hybrid supercapacitor may include a layered structure, which may include a first current collector, the lithium-alloy anode electrode, an ion-permeable separator, the carbon-based cathode electrode, and a second current collector. The electrolyte may be contained within a casing of the supercapacitor to allow ion movement through the ion-permeable separator so that ions can be adsorbed to the electrodes as a voltage is applied across the layered structure.

The above-described layered structure is exemplary, and one skilled in the art will appreciate, with the benefit of the presently disclosed invention, that other configurations of the layered structure may be utilized. For example, a layered structure array may include the first current collector (e.g., aluminum) with the carbon-based cathode material disposed on a surface thereof adjacent an ion-permeable separator (e.g., porous polyethylene), which may be adjacent the second current collector (e.g., copper) with the lithium-alloy anode material disposed on a surface thereof. The layered structure array may be configured in serial construction with additional layered structured arrays, in which each layered structure array may be separated by an ion permeable separator. The additional layered structured arrays may be the same as or different from the layered structured array described above. For instance, an additional layered structure array may include another first current collector with the carbon-based cathode material disposed on a surface thereof, or another second current collector with the lithium-alloy anode material disposed on a surface thereof. Generally, each additional layered structure array would be positioned so that a cathode of one array would be next to an anode of the adjacent array (separated by an ion-permeable separator) so that charging and discharging may be performed between the layered structures.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A supercapacitor system, comprising:
   a lithium-alloy anode, a carbon-based cathode, comprising porous carbon and coupled to the lithium-alloy anode; and,
   an electrolyte;
   wherein the lithium-alloy anode, the carbon-based cathode, and the electrolyte form a supercapacitor system, and
   wherein the lithium-alloy anode further comprises crystalline domains dispersed in an amorphous matrix.

2. The supercapacitor recited in claim 1, wherein the lithium-alloy anode comprises a member of the group consisting of silicon, germanium, and tin.

3. The supercapacitor recited in claim 2, wherein short charge transport paths of lithium-alloy anodes are generated due to the reduced-sized particles.

4. The supercapacitor recited in claim 2, wherein lower charge transfer resistance of lithium-alloy anodes is generated by boron doping of the anode.

5. The supercapacitor recited in claim 1, wherein the porous carbon has a hierarchical porous structure.

6. The supercapacitor recited in claim 1, wherein the electrolyte includes lithium salts.

7. The supercapacitor recited in claim 6, wherein the lithium-alloy anode can reversibly react with Li.

8. The supercapacitor recited in claim 1, wherein the supercapacitor operates between 2.0-4.5 V with a high energy density of 128 Wh/kg at a power density of 1229 W/kg.

9. A supercapacitor, comprising:
   a doped lithium-alloy anode, comprising materials that can form an alloy with lithium, the doped lithium-alloy anode further comprising crystalline domains dispersed in an amorphous matrix;
   a carbon-based cathode coupled to the lithium-alloy anode, comprising porous carbon; and,
   an electrolyte;
   wherein the lithium-alloy anode, the carbon-based cathode, and the electrolyte form a supercapacitor.

10. The supercapacitor recited in claim 9, wherein short charge transport paths and lower charge transfer resistance are generated due to the reduced-sized particles and doping.

11. The supercapacitor recited in claim 9, wherein the porous carbon has a hierarchical porous structure.

12. The supercapacitor recited in claim 9, wherein the electrolyte includes lithium salts.

13. The supercapacitor recited in claim 9, wherein the supercapacitor is configured to operate between 2.0-4.5 V with an energy density of 128 Wh/kg at a power density of 1229 W/kg.

14. The supercapacitor of claim 9, wherein the anode comprises a material selected from the group consisting of silicon, germanium, and tin.

\* \* \* \* \*